Mar. 3, 1925.

C. R. HOUGHTON ET AL

METER

Filed Sept. 27, 1923

1,528,728

2 Sheets-Sheet 1

INVENTOR
Carl R. Houghton and
John T. Wilkin,
BY
Arthur M. Hood.
ATTORNEY

Patented Mar. 3, 1925.

1,528,728

UNITED STATES PATENT OFFICE.

CARL R. HOUGHTON AND JOHN T. WILKIN, OF CONNERSVILLE, INDIANA, ASSIGNORS TO CONNERSVILLE BLOWER COMPANY, OF CONNERSVILLE, INDIANA, A CORPORATION OF INDIANA.

METER.

Application filed September 27, 1923. Serial No. 665,065.

*To all whom it may concern:*

Be it known that we, CARL R. HOUGHTON and JOHN T. WILKIN, citizens of the United States, residing at Connersville, in the county of Fayette and State of Indiana, have invented new and useful Improvements in Meters, of which the following is a specification.

Our invention relates to improvements in details of construction of large volume gas meters of that type in which there are two co-acting lobed impellers arranged within a suitable casing.

Figure 1:
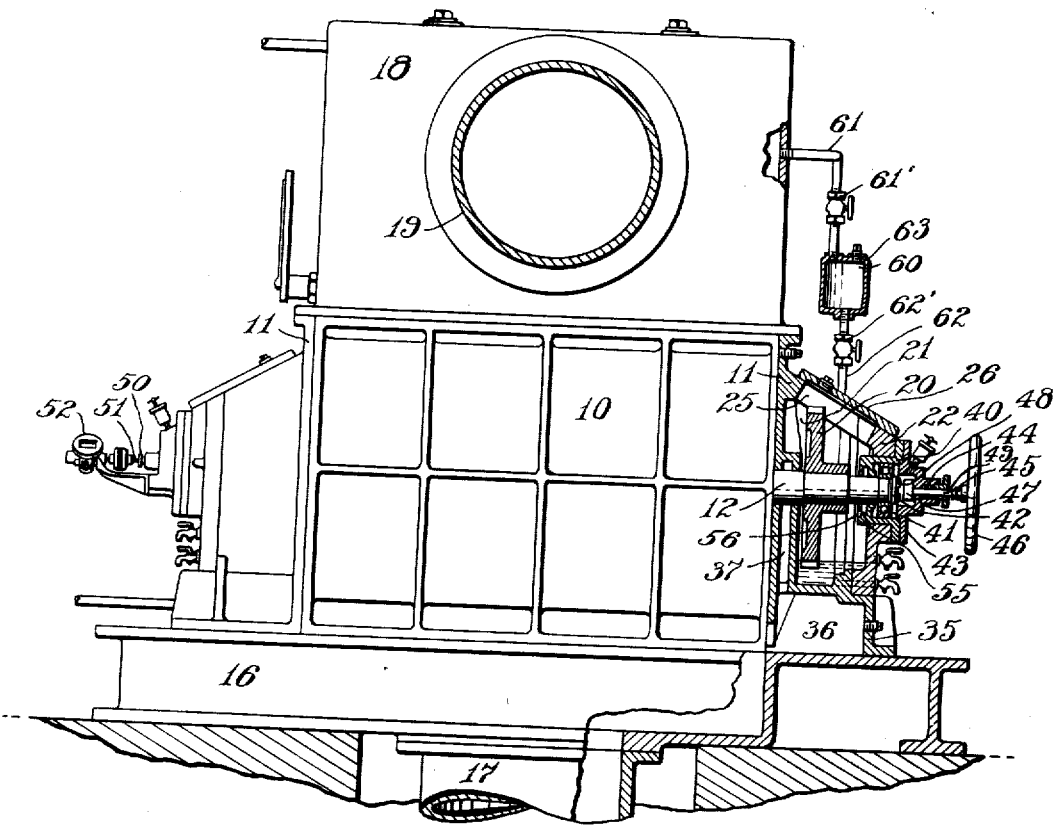
Figure 2:
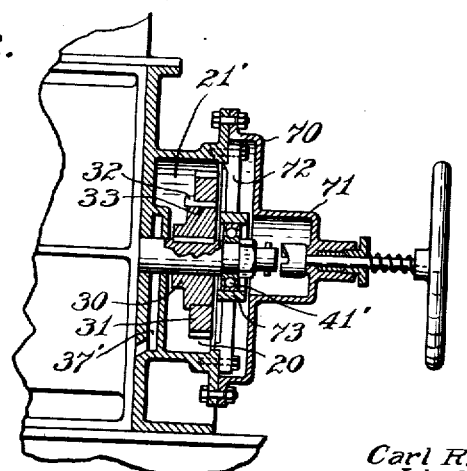
Figure 3:
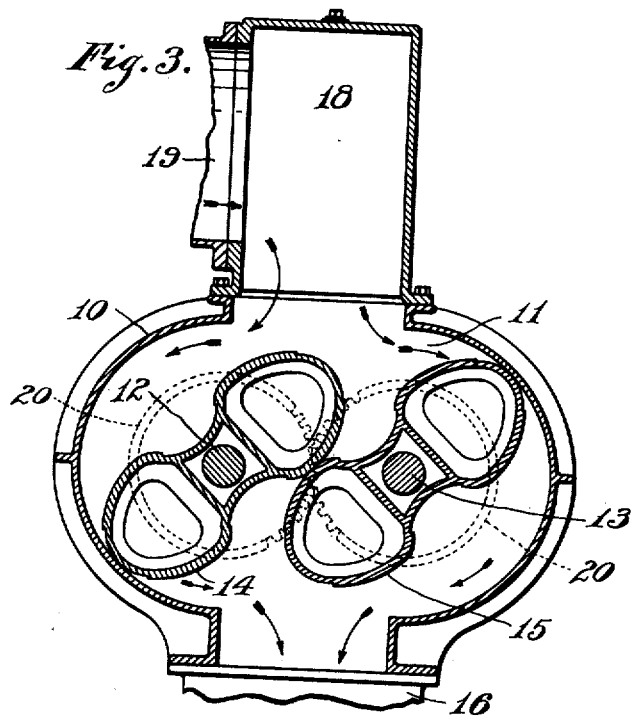
Figure 4:
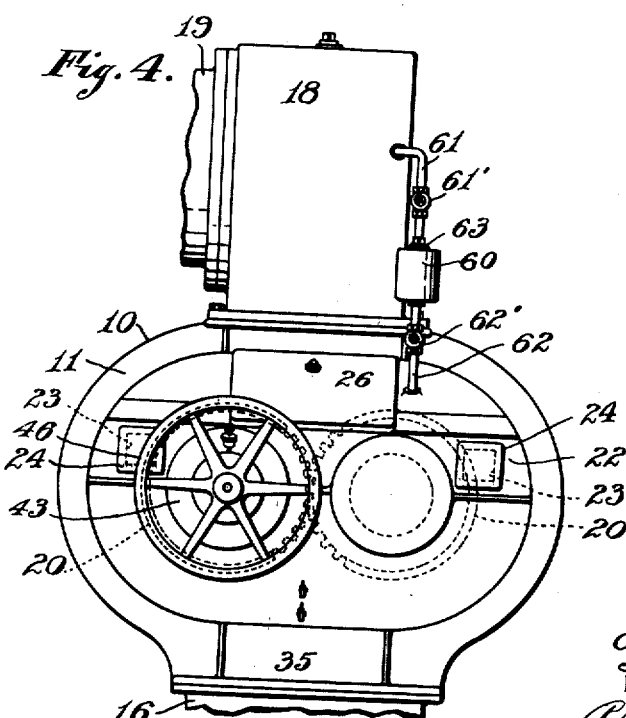

The accompanying drawings illustrate our invention. Fig. 1 is a side elevation, in partial vertical section, of a meter embodying our invention; Fig. 2, a fragmentary vertical section of a modification; Fig. 3, a transverse section, and Fig. 4 an end elevation.

In the drawings 10 indicates a suitable enclosing casing comprising plates 11 through which are projected shafts 12 and 13 of the lobed impellers 14 and 15 of a form well known in lobed impeller pumps.

Associated with casing 10 is a hollow base 16, to which the discharge pipe 17 is connected, and an inlet chamber 18 to which the inlet pipe 19 is connected.

The shafts 12 and 13 are connected at each end by a pair of intermeshing gears 20, the teeth of which are formed with substantial backlash, the two pairs of gears being oppositely set as to backlash for the reason that, as the gas to be measured flows through the meter, the impelling force of the gas acts first upon one impeller and then upon the other and by setting the gears in opposition as to backlash, both impellers are continuously and uniformly advanced by the flowing gas.

Each pair of gears is enclosed in a gas-tight chamber 21 conveniently formed in part in the end plate 11, as shown in Fig. 1, and by a head plate 22 having hand holes 23 covered by removable covers 24, and also having an inclined top aperture at 25 and closed by a cover 26, the arrangement being such that convenient access through aperture 25 may be had to the teeth of the gears so that they may be easily filed and fitted, if necessary, and access may be had through the hand holes 23 for angular adjustment of the gears.

For convenience, the gears are preferably formed with a hub 30 which is firmly keyed to the shaft, and a toothed ring 31 which is keyed to hub 30 by a gib key 32 lying in a slot 33 in the ring and having an angular extent sufficient to permit desired angular adjustment of the ring on the hub.

In the form shown in Fig. 1, chamber 21 is supported at its outer end by a leg 35 which rests upon base 16 and forms a gas space 36 communicating, through the hollow base 16, with the discharge pipe 17. A passage 37 forms a conduit forming a communication between space 36 and an intermediate portion of that portion of the shaft 12 which lies in end 11, the arrangement being such that any leakage which may take place from the inlet side of casing 10 around shafts 12 and 13 will pass through passage 37 to the discharge pipe instead of entering the gear chamber 21.

The head place 22 is readily removable without destroying the gas-tight joint between foot 35 and base 16 and carries a pair of outwardly presented cups 40 which are arranged in alignment with shafts 12 and 13 and form supports for the outer races of ball bearings 41 which support the outer ends of shafts 12 and 13, each of said bearings being held in place by a removable collar 42 secured to the end of the shaft. The outer end of each cup 40 is closed by a removable cap 43.

One of the caps 43 is provided with an axial bore and packing gland 44 to receive a shaft 45 provided at its outer end with a hand wheel 46 and at its inner end with a clutch head 47 conveniently formed to co-act with the bolts 48 which hold ring 42 in place, the arrangement being such that initial turning movement of the impellers may be started by force applied by hand to the wheel 46. A spring 49 serves to normally hold the head 47 out of engagement with bolts 48 so that the impellers are not subjected to the frictional resistance of shaft 45 in gland 44 during normal operation.

Another one of the caps 43 is provided with a packing gland 50 through which is extended a small shaft 51 connected to a suitable counter or register 52 which will register the movement of the impellers in order that the volume of gas passing through the meter may be determined.

Each bearing 41 is additionally protected from injury by the gas or its content by an annular chamber 55 formed in the bottom of cup 40 around the shaft and vented at 56 into chamber 21.

Suitable lubricants may be maintained in chamber 21 and cups 40. The outwardly presented cups 40 offer excellent receptacles for a grease lubricant and when such lubricant fills the cups, the ball bearings are thoroughly protected from erosion by emissions from the interior of the impeller casing. This is highly important in handling many kinds of gases.

It is quite desirable, in many instances, to be able to renew the lubricant in chamber 21, and, as pressure accumulates in this chamber, we have provided means for introducing the lubricant without release of this pressure and without the necessity of stopping the movement of the meter.

For this purpose, we provide a preliminary receiving chamber 60 connected by pipe 61 with the inlet casing 18 and by pipe 62 to the interior of chamber 21. Pipe 61 is provided with a valve 61' and a pipe 62 with a valve 62'. Chamber 60 is provided with a normally closed filling opening 63, the arrangement being such that, by first closing valves 61' and 62' and opening the filling opening 63, a suitable quantity of lubricant may be introduced into chamber 60 whereupon, by closing opening 63 and opening valves 62' and 61' the lubricant may be forced under pressure from the supply side of the gas line into chamber 21.

In the form shown in Fig. 2, chamber 21', corresponding to chamber 21 in the other form, is closed, at its outer end, by cover 70 which will carry a boss 71 appropriately bored and packed for the receipt of either the starting shaft or counter shaft, as previously described.

Instead of cup 40, we provide in this form, a spider 72 removably attached across the mouth of chamber 21' and having a bored hub 73 for the reception of the shaft bearing 41'. The gears in chamber 21' are protected from the gases by means of a passage 37' similar to passage 37.

In meters of this type, the impeller elements are often quite large and unavoidably quite heavy while the gas pressure, effective for causing turning movement of the impellers is necessarily very small, owing to the fact that it is quite important that the differential pressure, i. e., the difference between the pressures at the inlet and outlet of casing 10 should be as small as possible. It is, therefore, important that the bearings of the shafts of the impellers offer the least possible resistance to movement of the impellers and ball bearings are, of course, desirable in this connection. However, the steel from which commercial bearing balls are made is, in most instances, corroded by the gas or gas content and it is for this reason that we have arranged the ball bearings at the greatest possible distance from the interior of the casing 10 and have protected these bearings, by the provision of passages 37, 37', and 55 from the deleterious substances carried by the gas.

We claim as our invention:

1. In a gas meter, the combination of a main casing, a pair of lobed rotary elements mounted therein and having their shafts projected through the end walls of said casing, a pair of intermeshing gears carried by projected ends of said shafts, outboard bearings for said projected shaft-ends beyond the gears, and means for enclosing said gears and bearings to prevent external leakage from the space surrounding said gears and bearings.

2. In a gas meter, the combination of a main casing, a pair of lobed rotary elements mounted therein and having their shafts projected through the end walls of said casing, a casing forming an externally gastight chamber enclosing said projected shaft-ends, a pair of intermeshing gears carried by said shaft-ends in said chamber, and bearings for said shaft ends beyond the gears within the chamber.

3. In a gas meter, the combination of a main casing, a pair of lobed rotary elements mounted therein and having their shafts projected through the end walls of said casing, a pair of intermeshing gears carried by the projected ends of said shafts, an externally gas-tight chamber enclosing said gears and shaft-ends, outwardly presented bearing cups arranged in the outer wall of said chamber in alinement with said shaft-ends, antifriction bearings for said shaft-ends arranged in said cups, and removable gas-tight covers for said cups.

4. In a gas meter, the combination of a main casing, a pair of lobed rotary elements mounted therein and having their shafts projected through the end walls of said casing, a pair of intermeshing gears carried by projected ends of said shafts, outboard bearings for said projected shaft-ends beyond the gears, and means for enclosing said gears and bearings to prevent external leakage from the space surrounding said gears and bearings, said end wall having a conduit surrounding each shaft closely adjacent but spaced from the inner face of the end wall and leading to the discharge side of the meter.

5. In a gas meter, the combination of a main casing, a pair of lobed rotary elements mounted therein and having their shafts projected through the end walls of said casing, a casing forming an externally gastight chamber enclosing said projected shaft-ends, a pair of intermeshing gears carried by said shaft-ends in said chamber, and bearings for said shaft-ends beyond the gears within the chamber, said end wall having a conduit surrounding each shaft closely adjacent but spaced from the inner face of the end wall and leading to the discharge side of the meter.

6. In a gas meter the combination of a main casing, a pair of lobed rotary elements mounted therein and having their shafts projected through the end walls of said casing, a pair of intermeshing gears carried by said shaft-ends, a casing forming an externally gas-tight chamber enclosing said gears and shaft-ends, said end wall having a conduit surrounding each shaft closely adjacent but spaced from the inner face of the end wall and leading to the discharge side of the meter.

7. In a gas meter the combination of a main casing, a pair of lobed rotary elements mounted therein and having their shafts projected through the end walls of said casing, a gas-tight enclosure for each projecting shaft end, an anti-friction bearing for each shaft, and a support for said bearing forming a lubricant-containing chamber isolatable from the interior of the impeller casing and the aforesaid gas-tight enclosure.

8. In a gas meter the combination of a main casing, a pair of lobed rotary elements mounted therein and having their shafts projected through the end walls of said casing, a casing forming an externally gas-tight chamber enclosing said shaft ends, outwardly presented grease retaining bearing cups enveloping said shaft ends, and an anti-friction bearing supported in each cup and supporting the adjacent shaft.

In witness whereof, we have hereunto set our hands at Connersville, Indiana.

CARL R. HOUGHTON.
JOHN T. WILKIN.

gears within the chamber, said end wall having a conduit surrounding each shaft closely adjacent but spaced from the inner face of the end wall and leading to the discharge side of the meter.

6. In a gas meter the combination of a main casing, a pair of lobed rotary elements mounted therein and having their shafts projected through the end walls of said casing, a pair of intermeshing gears carried by said shaft-ends, a casing forming an externally gas-tight chamber enclosing said gears and shaft-ends, said end wall having a conduit surrounding each shaft closely adjacent but spaced from the inner face of the end wall and leading to the discharge side of the meter.

7. In a gas meter the combination of a main casing, a pair of lobed rotary elements mounted therein and having their shafts projected through the end walls of said casing, a gas-tight enclosure for each projecting shaft end, an anti-friction bearing for each shaft, and a support for said bearing forming a lubricant-containing chamber isolatable from the interior of the impeller casing and the aforesaid gas-tight enclosure.

8. In a gas meter the combination of a main casing, a pair of lobed rotary elements mounted therein and having their shafts projected through the end walls of said casing, a casing forming an externally gas-tight chamber enclosing said shaft ends, outwardly presented grease retaining bearing cups enveloping said shaft ends, and an anti-friction bearing supported in each cup and supporting the adjacent shaft.

In witness whereof, we have hereunto set our hands at Connersville, Indiana.

CARL R. HOUGHTON.
JOHN T. WILKIN.

DISCLAIMER.

1,528,728.—*Carl R. Houghton* and *John T. Wilkin*, Connersville, Ind. METER. Patent dated March 3, 1925. Disclaimer filed June 20, 1927, by the assignee, *Connersville Blower Company*.

Hereby enters its disclaimer to so much of claims 1, 2, 3, 4, 5, 6, 7 and 8, respectively, as may cover a gas meter as specified in said claims, respectively, in which the bearings for the shafts of the lobed rotary elements are not antifriction rolling bearings.

So that said claims above enumerated, and each of them, will cover a gas meter as specified in said claims, respectively, in which the bearings for the shafts of the lobed rotary elements are antifriction rolling bearings.

[*Official Gazette July 12, 1927.*]

DISCLAIMER.

1,528,728.—*Carl R. Houghton* and *John T. Wilkin*, Connersville, Ind. METER. Patent dated March 3, 1925. Disclaimer filed July 18, 1927, by the assignee, *Connersville Blower Company*.

Hereby enters its disclaimer as follows, to wit:

(1) To so much of claim 2 as may cover a gas meter, as specified in said claim, in which the pair of intermeshing gears, the casing forming the externally gas-tight chamber, and the bearings, as specified in said claim, are not provided at each end of said meter, and in which the teeth of the gears are not formed with substantial backlash and oppositely set as to backlash;

So that said claim will cover a gas meter, as specified in said claim, in which the pair of intermeshing gears, the casing forming the externally gas-tight chamber, and the bearings, as specified in said claim, are provided at each end of said meter, and in which the teeth of the gears are formed with substantial backlash and oppositely set as to backlash.

(2) To so much of claim 5 as may cover a gas meter, as specified in said claim, in which the pair of intermeshing gears, the casing forming an externally gas-tight chamber, the bearings, and the end wall having a conduit, as specified in said claim, are not provided at each end of said meter, and in which the teeth of the gears are not formed with substantial backlash and oppositely set as to backlash;

So that said claim will cover a gas meter, as specified in said claim, in which the pair of intermeshing gears, the casing forming an externally gas-tight chamber, the bearings, and the end wall having a conduit, as specified in said claim, are provided at each end of said meter, and in which the teeth of the gears are formed with substantial backlash and oppositely set as to backlash.

[*Official Gazette August 2, 1927.*]

DISCLAIMER.

1,528,728.—*Carl R. Houghton* and *John T. Wilkin*, Connersville, Ind. METER. Patent dated March 3, 1925. Disclaimer filed June 20, 1927, by the assignee, *Connersville Blower Company*.

Hereby enters its disclaimer to so much of claims 1, 2, 3, 4, 5, 6, 7 and 8, respectively, as may cover a gas meter as specified in said claims, respectively, in which the bearings for the shafts of the lobed rotary elements are not antifriction rolling bearings.

So that said claims above enumerated, and each of them, will cover a gas meter as specified in said claims, respectively, in which the bearings for the shafts of the lobed rotary elements are antifriction rolling bearings.

[*Official Gazette July 12, 1927.*]

DISCLAIMER.

1,528,728.—*Carl R. Houghton* and *John T. Wilkin*, Connersville, Ind. METER. Patent dated March 3, 1925. Disclaimer filed July 18, 1927, by the assignee, *Connersville Blower Company*.

Hereby enters its disclaimer as follows, to wit:

(1) To so much of claim 2 as may cover a gas meter, as specified in said claim, in which the pair of intermeshing gears, the casing forming the externally gas-tight chamber, and the bearings, as specified in said claim, are not provided at each end of said meter, and in which the teeth of the gears are not formed with substantial backlash and oppositely set as to backlash;

So that said claim will cover a gas meter, as specified in said claim, in which the pair of intermeshing gears, the casing forming the externally gas-tight chamber, and the bearings, as specified in said claim, are provided at each end of said meter, and in which the teeth of the gears are formed with substantial backlash and oppositely set as to backlash.

(2) To so much of claim 5 as may cover a gas meter, as specified in said claim, in which the pair of intermeshing gears, the casing forming an externally gas-tight chamber, the bearings, and the end wall having a conduit, as specified in said claim, are not provided at each end of said meter, and in which the teeth of the gears are not formed with substantial backlash and oppositely set as to backlash;

So that said claim will cover a gas meter, as specified in said claim, in which the pair of intermeshing gears, the casing forming an externally gas-tight chamber, the bearings, and the end wall having a conduit, as specified in said claim, are provided at each end of said meter, and in which the teeth of the gears are formed with substantial backlash and oppositely set as to backlash.

[*Official Gazette August 2, 1927.*]